(12) United States Patent
Angelescu

(10) Patent No.: US 9,671,929 B2
(45) Date of Patent: Jun. 6, 2017

(54) METHOD FOR RESOLVING AND OPERATING POI STACKS

(71) Applicant: AUDI AG, Ingolstadt (DE)

(72) Inventor: Emanuel Angelescu, Köln (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/782,858

(22) PCT Filed: Feb. 14, 2014

(86) PCT No.: PCT/EP2014/000409
§ 371 (c)(1),
(2) Date: Oct. 7, 2015

(87) PCT Pub. No.: WO2014/166564
PCT Pub. Date: Oct. 16, 2014

(65) Prior Publication Data
US 2016/0054891 A1 Feb. 25, 2016

(30) Foreign Application Priority Data
Apr. 8, 2013 (DE) .................. 10 2013 006 025

(51) Int. Cl.
G09G 5/24 (2006.01)
G06F 3/0481 (2013.01)
(Continued)

(52) U.S. Cl.
CPC ..... G06F 3/04817 (2013.01); G01C 21/3682 (2013.01); G06F 3/04842 (2013.01);
(Continued)

(58) Field of Classification Search
CPC .................................................. G01C 21/3682
(Continued)

(56) References Cited

U.S. PATENT DOCUMENTS 6,873,907 B1 * 3/2005 Millington ......... G01C 21/3611
701/410
7,076,741 B2 * 7/2006 Miyaki .............. G01C 21/3664
715/712
(Continued)

FOREIGN PATENT DOCUMENTS

CN 101852620 A 10/2010
DE 10230479 1/2004
(Continued)

OTHER PUBLICATIONS

International Search Report issued by the European Patent Office in International Application PCT/EP2014/000409 on Feb. 14, 2014.
(Continued)

Primary Examiner — Javid A Amini
(74) Attorney, Agent, or Firm — Henry M. Feiereisen LLC

(57) ABSTRACT

A method for resolving and operating POI stacks in a virtual environment displayed on an image screen surface, automatically scales, upon selecting a first POI stack with a first quantity of POI's contained in the POI stack, the representation of the virtual environment such that POI's contained in the first POI stack are displayed on the image screen surface such that individual POI's, when correctly positioned in the virtual environment, maintain a minimum size and a minimum distance to respective neighboring POI's, and, if the minimum distance cannot be maintained, a partial quantity of the quantity of POI's of the first POI stack is combined in at least one second POI stack on the basis of the respective position of the individual POI's in the virtual environment. A corresponding system is also described.

8 Claims, 2 Drawing Sheets

(51) Int. Cl.
*G01C 21/36* (2006.01)
*G06F 3/0484* (2013.01)
*G06T 3/40* (2006.01)
*G06T 11/20* (2006.01)

(52) U.S. Cl.
CPC .............. *G06T 3/40* (2013.01); *G06T 11/206* (2013.01); *G06F 2203/04805* (2013.01); *G06F 2203/04806* (2013.01)

(58) Field of Classification Search
USPC .......................................................... 345/633
See application file for complete search history.

(56) References Cited

U.S. PATENT DOCUMENTS

| | | | | |
|---|---|---|---|---|
| 2003/0023374 | A1* | 1/2003 | Shimabara | G09B 29/106 701/455 |
| 2004/0098195 | A1 | 5/2004 | Listle | |
| 2004/0243306 | A1* | 12/2004 | Han | G01C 21/3682 701/438 |
| 2009/0055774 | A1* | 2/2009 | Joachim | G06F 3/0483 715/810 |
| 2009/0150795 | A1* | 6/2009 | Vargiya | G06F 17/30241 715/744 |
| 2010/0058212 | A1 | 3/2010 | Belitz | |
| 2010/0077361 | A1* | 3/2010 | Watkins | G01C 21/3682 715/863 |
| 2011/0022393 | A1 | 1/2011 | Waeller | |
| 2012/0046861 | A1 | 2/2012 | Feldbauer | |
| 2013/0173159 | A1* | 7/2013 | Trum | G01C 21/3617 701/533 |
| 2013/0321465 | A1* | 12/2013 | Takeuchi | G01C 21/3682 345/634 |

FOREIGN PATENT DOCUMENTS

| | | |
|---|---|---|
| DE | 102007030229 | 1/2009 |
| DE | 102007037386 | 2/2009 |
| DE | 102008051756 | 5/2009 |
| DE | 102009042724 | 6/2010 |
| JP | 2010085199 | 4/2010 |
| WO | WO2012/110882 | 8/2012 |

OTHER PUBLICATIONS

Chinese Search Report issued on Jun. 29, 2016 by the Chinese Patent Office in counterpart Chinese Patent Application No. 2014800147220.

English translation of Chinese Search Report issued on Jun. 29, 2016 by the Chinese Patent Office in counterpart Chinese Patent Application No. 2014800147220.

* cited by examiner

METHOD FOR RESOLVING AND OPERATING POI STACKS

CROSS-REFERENCES TO RELATED APPLICATIONS

This application is the U.S. National Stage of International Application No. PCT/EP2014/000409, filed Feb. 14, 2014, which designated the United States and has been published as International Publication No. WO 2014/166564 and which claims the priority of German Patent Application, Serial No. 10 2013 006 025.7, filed Apr. 8, 2013, pursuant to 35 U.S.C. 119(a)-(d).

BACKGROUND OF THE INVENTION

The present invention relates to a method and a system for resolving and operating POI stacks in a virtual environment displayed on a screen surface.

A navigation in a virtual environment places high demands on a user. Especially in virtual environments, which provide additional information through selectable items, a high degree of attentiveness from the user is required to manage the presented information in a meaningful way. In particular, a change from an applied operating logic, such as a change from a crosshair-based scroll view to a list-based element selection requires from the user a complete reorientation by abstracting from the already executed operations in the crosshair-based scroll view. This reorientation is not only disruptive for the user experience in dealing with the virtual environment, but leads to dangerous deficits in attentiveness, especially in road traffic.

According to the invention, both a method and a system are provided which use a single operating logic for navigating in a virtual environment and in a list of selectable elements. The term element in the context of the method and the system according to the invention is to be understood as a part of a stack, in particular a stack that represents a set of points of interest (POI's). Point of Interests (POI) is a common term in conjunction with navigation systems and indicates a point on a map that could have significance for a user.

By applying the single operating logic for navigating in a virtual environment and in the list of selectable elements, both the reorientation as well as the abstraction of the already executed operations of the user become unnecessary and does not burden the user's attentiveness.

DE 102 30 479 A1 discloses a driver information device which displays, when several special objects are located at a position in the map, a common symbol instead of a single symbol for each of these objects, within which, in turn, a selection menu for selecting specific individual objects is displayed. For this purpose, a semi-transparent selection window is placed over a scroll plane based on a map view and the map view is rendered in a gray tone.

WO 2012/110882 A1 discloses an apparatus for displaying map information which includes a screen for displaying the map information and a navigation device. Information about locations in the vicinity of a displayed route is shown on the screen in such a way that it is integrated into the current map display, i.e. information about POI's from the periphery are integrated in a current routing so that associations between POI's of the current route and POI's in the peripheral can be displayed. For this purpose, combination symbols are used which contain information about peripheral POI's as well as information about current POI's.

DE 10 2007 030 229 A1 discloses a method and an apparatus for unobscured representation of closely spaced topographic objects in stylized form. The topographic objects are integrated into an illustrated map so that at least a permanent concealment of topographic elements of the map is avoided by the stylized representation in the map region that includes the geographic positions of the stylized objects, by a temporally and/or spatially offset display and/or by a display offset in a dimension outside the map layer and/or in a superimposed representation with link to a popup window where the overlay of stylized topographic objects is at least partially removed, and/or is prevented by a change in the scale of the map. POI's having completely identical geographical positions or geographical positions in close vicinity should be integrated into electronically displayable maps with the smallest possible mutual concealment and without compromising a map image. This is achieved by using a so-called toggling method, wherein objects are displayed in a cyclically alternating manner. In order to change a scale in a map region having several closely spaced POI's, this process must be initiated by a user. Such a pre-selected map segment may be displayed in a window or in a pop-up window within the originally displayed map. When using a pop-up window, the orientation of the user is facilitated in that a solid apex of the popup window forms a geographical connection element with the original position of the element on the geographical map.

US 2004/0243306 A1 discloses a method and an apparatus for a navigation system. The method includes the steps of specifying POI's on a preselected map section, a radial arrangement of individual POI's of POI stacks around the center of the pre-selected map section, and a representation of the location on the map, where the POI's were located before the step of radial arrangement, by connecting lines. The orientation of the user on the map layer is intended to be facilitated by overlaying radial edge zones that have a defined distance from the center of the selected map section. Furthermore, the disclosed method uses a function to shift individual POI's relative to a selection icon displayed in the center of the map.

Finally, DE 10 2007 037 386 A1 discloses a method for operating a navigation system. The method includes the following method steps:

a) calculating and displaying a map view on a display device, wherein the map view represents at least a section of a geographical area;

b) selecting from a database the locations to be highlighted, which are in the region of the represented geographical area and are each associated with a POI in the map view, c) representing the POI's in the map view, wherein POI's that symbolize locations in close vicinity to be highlighted, are shown by a common combination symbol, so that in each case a combination symbol represents several POI's, wherein the combination symbol has at least one display area in which at least one POI can be displayed, wherein the POI's associated with the combination symbol are displayed in the display area alternatingly in time.

The combination symbol that includes a plurality of POI's is to be rendered graphically so as to symbolize a stack with at least one panel. When a combination symbol is selected by the user, all POI's are displayed simultaneously side-by-side.

SUMMARY OF THE INVENTION

Against this background, it is an object of the invention to further simplify navigation in a virtual environment so that the navigation can be performed with the least amount of distraction and with a single operating logic.

This object is achieved with a method for resolving and operating POI stacks in a virtual environment displayed on a screen surface, wherein when selecting a first POI stack with a plurality of POI's contained in the POI stack, the representation of the virtual environment is automatically scaled such that POI's contained in the first POI stack are represented on the screen surface so that individual POI's maintain a minimum size and a minimum distance to the neighboring POI when correctly positioned in the virtual environment, and when the minimum distance cannot be maintained, a subset of the plurality of POI's contained in the first POI stack is combined in at least one second POI stack as a function of the respective position of the individual POI's in the virtual environment and with a system for resolving and operating POI stacks in a virtual environment, wherein the system comprises at least one display medium for displaying a geographical map and POI's contained thereon as well as a device for inputting user commands, wherein a user operates the system with the device and can navigate by way of a control logic through both the geographical map and within the POI stack. Further advantages and embodiments of the invention will be apparent from the description and the accompanying drawings and the respective dependent claims.

In the context of the present method and/or system according to the invention, a Point of Interest (POI) refers to any point of a virtual environment that could be of major interest to a user and that is either chosen by the user himself or is, due to special properties, already highlighted by the original virtual environment itself. These are in particular points of relevance for tourism, traffic engineering, or are of culinary, logistical or geographical relevance.

According to the invention, a method is now provided, which is used for resolving and operating POI-stacks in a virtual environment displayed on a screen surface, wherein when a first POI stack with a plurality of POI's contained in the POI stack is selected, the representation of the virtual environment is automatically scaled such POI's contained in the first POI stack are displayed on the screen surface so that individual POI's that are correctly positioned in the virtual environment maintain a minimum size and a minimum distance to respective neighboring-POI's, and if the minimum distance cannot be maintained, a subset of the set of POI's of the first POI stack is combined into at least a second POI stack as a function of the respective position of each POI in the virtual environment.

A representation of the entire quantity of information becomes problematic when navigating through virtual environments, especially when navigating through virtual geographical maps that provide a variety of additional information in the form of POI's. The potential information content that can be displayed on a display screen changes as a function of the respective displayed scale and the number of POI's that can be found on the respective displayed geographical area. When the displayed scale is small, i.e. when the scale number is high, such as 1:100,000, then the information quantity to be potentially displayed and provided by POI's is very large. The representation of all potential POI's would cover up the represented geographical map, making navigation impossible, especially in cities. In order to nevertheless enable an overview of both the geographical map and the POI's, the POI's are frequently combined into stacks and displayed on the geographical map as a stack.

When the displayed scale is large, i.e. when the scale number is small, for example 1:10, then the information quantity to be potentially displayed and provided by POI's is typically small. The POI's can then in general be displayed separately, thus maintaining the possibility for navigation.

According to the invention, the two aforementioned display methods are fused in that by selecting a POI stack displayed on a small scale, the displayed scale of the geographical map is changed and increased until all or at least a portion of the POI's contained in the POI stack can be displayed individually and can be correctly positioned in the virtual environment while still enabling navigation.

If the number of POI's to be displayed is nevertheless too large to represent them in a meaningful way, i.e., to represent them so that navigation on the geographical map is still possible, then a portion of POI's that are geographically close to each other are combined in another, usually smaller POI stack. This stack is then available for selection, which can lead to a renewed rescaling the scale of the representation. If the largest possible scale has already been reached, then the POI's included in the additional POI stack are displayed geographically abstracted, thus enabling a selection with the same operating logic that was used previously.

Navigation within a selected POI stack is carried out according to the invention in the same operating logic that forms the basis for navigating in the virtual environment. The navigation in the virtual environment can be operated via input devices such as a computer mouse, a keyboard, a touch-sensitive field, by a touch-sensitive screen area, by input devices specially designed for this purpose, in particular by rotary wheels and/or rotary switches and/or rotary-push button switches.

According to one possible embodiment of the method according to the invention, the minimum distance may be formed as a function of a threshold value, wherein the threshold value is calculated dynamically and as a function of an available screen area and the total number POI's to be represented, resulting in a maximum number of POI's that can be displayed simultaneously in a meaningful way when correctly positioned in the virtual environment.

According to the invention, to represent the POI's of a selected stack in a meaningful way, new POI stacks may be formed from a subset of POI's of the selected POI stack and as a function of the above-mentioned threshold value. This threshold value is dynamic, i.e. it changes depending on how many POI's must actually be represented and on the scale available for the geographical area of interest.

To calculate the threshold value, a maximum number of POI's is calculated based on available screen space on the screen, which depends on the resolution of the screen, the physical size of the screen, a desired readability and additionally superimposed POI's, which can be represented simultaneously with correct positioning. If the actual number of existing POI's within a POI stack exceeds the calculated value, new POI stacks are formed until the number of symbols to be represented is in agreement with the calculated threshold value.

Moreover, the POI's of a POI stack may be combined into POI stacks depending on the calculated threshold value and represented in abstract form, if every possible, i.e. selectable scaling of the representation of the virtual environment is inadequate for a full-scale representation of the POI's.

In some cases, it may be impossible to represent the POI's of a POI stack separately even when using the largest possible scale. This is especially the case in high-rise buildings where a large number of POI's is present at the same geographical position. To nevertheless display these POI's within the same user logic, these POI's are shown abstracted in their geographic location. This means that the POI's are arranged at a level that is visually distinguishable from the geographical map, where they are presented for selection.

In addition, the selection of the POI's is executed within the same operating logic that is used for navigating in the virtual environment.

According to the invention, the operating logic that is used for navigating in the virtual environment, i.e. the manner in which the users deals with and provides inputs to the method according to the invention or the system according to the invention is maintained when selecting a POI stack. In particular in situations where the system should be operated by paying only little attention, such as when operating a motor vehicle, a change in the operating logic that occurs, for example, when changing from a representation of a map to a representation of a list in table form is annoying to the user, since the user has to reorient himself and abstract the already made orientation effort. Furthermore, already used input tools can be retained while maintaining the same operating logic. This simplifies the operation of selected POI stacks.

In another embodiment of the method according to the invention, the element closest to a position indicator may be automatically pre-selected.

The user navigates across the geographical map and the selected POI stacks by using a selection tool, e.g. in the form of a crosshair. Once a POI stack is selected by the user, the POI stack is divided into its components, i.e. the POI's contained in the POI stack and the respective virtual environment are represented in an adapted scale. In addition, the POI closest to the selection tool appears as pre-selected, i.e. is emphasized optically as well as logically. According to the invention, this pre-selection allows a brief navigation within the POI stack requiring low attentiveness.

It is thus possible to illustrate an optical logical connection between a selection tool and a selected element in order to emphasize a selection of an element.

A less fatiguing transmission of information is desirable especially for inputs of a driver of a motor vehicle. The visual representation is here of particular importance. To show the current selection of a POI or a POI stack, the logical connection between the selection tool and the selected POI or POI stack is also visually emphasized in a possible embodiment of the invention by displaying a link, in particular a colored link. According to the invention, the illustrated selection can be immediately recognized by the user and intuitively acted upon.

In a further embodiment of the method according to the invention, routing to a selected element is initiated by a user.

In order to operate the method according to the invention in a navigation device in a useful manner, it is imperative that the user can request routing from his current position, which is determined, for example, via satellite navigation, towards a POI selected by him.

Further, the present invention is directed to a system for resolving and handling of POI-stacks in a virtual environment, wherein the system includes at least a display medium for displaying a geographical map and POI's included on the map as well as a device for inputting user commands, wherein the user can operate the system via the device and can navigate by way of an operating logic both through the virtual environment and within the POI stack.

Any technically suitable screen area, in particular the surface of an LCD screen or an LED screen, can be used to represent the geographical map and the POI contained thereon. For entering the user commands, in particular devices from the following list can be used: rotary switches, rotary pushbutton switches, touch screens, computer mice and voice input.

In another embodiment of the system according to the invention, a respective position of the user may be determined via a GPS receiver and transmitted to the system.

Use of the system according to the invention as a navigation system requires determining the respective position of the user and displaying the virtual environment in relation to this position.

In contrast to the use of a list view that is shown separately from the information of the geographical map for a geographic location of aggregated POI's, as disclosed, for example, in DE 102 30 479 A1 or DE 2007 030 229 A1, the method according to the invention contemplates integrating the POI's in the underlying geographical map. An abstraction of knowledge on the POI, which has already been determined on the geographical map, is not necessary, because the POI's are displayed within the geographical map. The method according to the invention can also be integrated into existing systems and/or methods for navigating in virtual environments.

One possible way to resolve POI stacks element-by-element is disclosed in US 2004/0243306 A1, where a number of POI's are automatically arranged in a map area radially and enlarged around the center of the screen regardless of their geographical location. Leader lines pointing from the respective POI to the corresponding position on the geographical map serve as an indication of the actual geographical location of the associated POI's. This type of display requires a high degree of attentiveness, since both tracking of the individual leader lines as well as selection of individual POI's must be made by way of a separate list-based operating logic. The method and system according to the present invention solves the above object by relieving the user by using processes requiring little attentiveness. Because the user needs to find his way only within a single operating logic, operation of the method and system according to the invention is intuitive and effective.

It will be understood that the aforementioned features as well as those features yet to be explained below can be used not only in the particular indicated combination but also in other combinations or severally, without departing from the scope of the present invention.

BRIEF DESCRIPTION OF THE DRAWING

The invention is schematically illustrated in the drawings by way of embodiments and will be described schematically and in detail with reference to the drawing.

DETAILED DESCRIPTION OF PREFERRED EMBODIMENTS

Figure 1A:
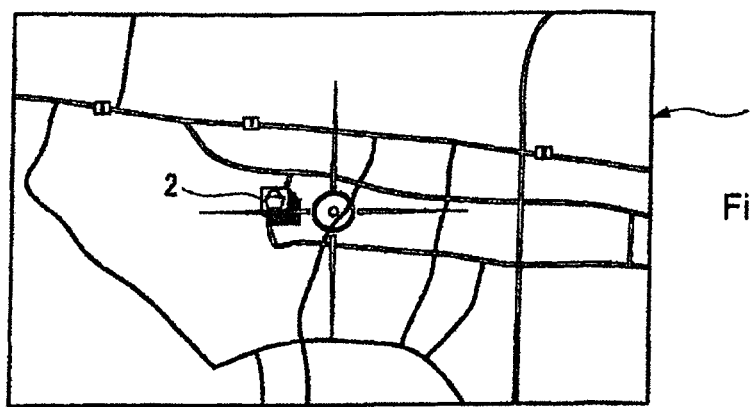
FIGS. 1a, 1b, 1c, 1d, and 1e show a schematic process flows of a selection of POI's from a POI stack in accordance with an embodiment of the method according to the invention.

As shown in FIG. 1a, in an initial situation 1, a user navigates across a geographical map by using a suitable input device, such as a rotary switch or a touch screen field. Here, a selection tool in the form of a crosshair is displayed to the user. By using the selection tool, the user is able to quickly orient himself within the geographical map even at small scales. Since by using a small scale, only small areas are available in the virtual environment for representing a particular area, information pertaining to individual Points of Interest (POI) can only be displayed by obscuring an additional area on the geographical map, resulting in loss of information.

Figure 1B:
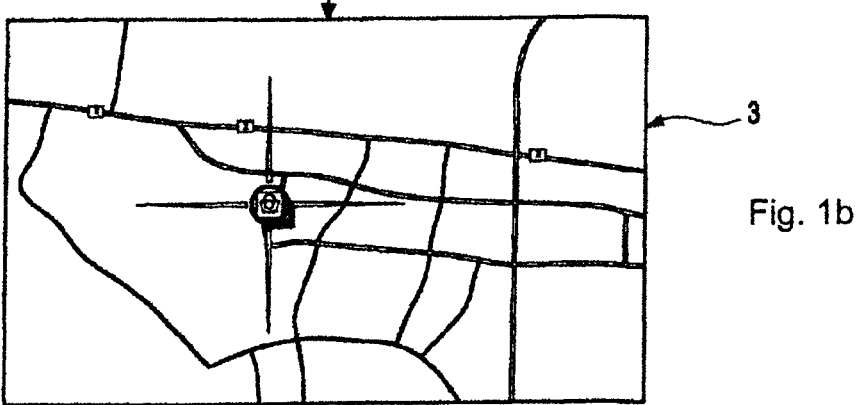
Figure 1C:
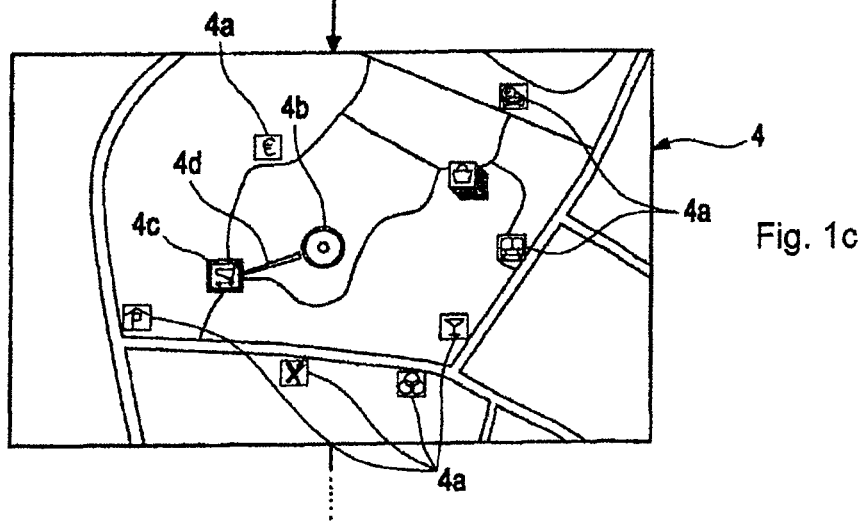

To prevent this loss of information, several POI's are combined in one or more POI stacks 2. Should the user desire information on individual POI's of the POI stack 2 as shown in FIG. 1a, then the user can select this stack 2 with the selection tool, as shown in illustration 3 in FIG. 1b, with the method according to the invention then causing automatic rescaling of the scale, as shown in illustration 4 in FIG. 1c, as well as representing individual POI's 4a of POI stack. The individual POI's 4a are arranged so that they can be selected in a meaningful way, i.e. the individual POI's have a minimum distance from each other and a minimum size. For ease of use by the user, the representation of the selection tool 4b is changed and the POI 4c closest to the selection tool is automatically pre-selected. The selection tool shows a logical connection between the position of the selection tool and the pre-selected POI 4c in the form of a tapered line 4d as shown in FIG. 1c. By moving the selection tool towards a POI by way of user input, the selection between the illustrated POI's can be changed, as shown in illustration 5 as shown in FIG. 1d.

Figures 1D, 1E:
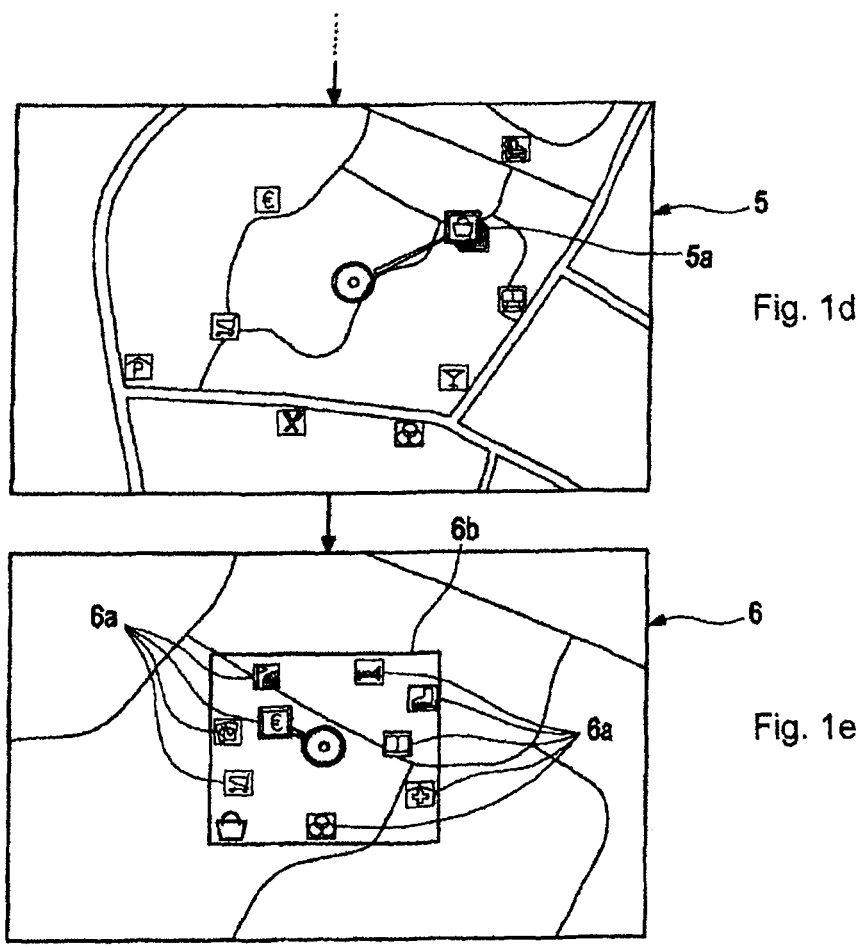

If an individual representation is not possible for all POI's of a POI stack, a subset of the POI's of the POI stack is combined again into a POI stack 5a through a dynamic process of the invention as shown in FIG. 1d. Since these POI stacks usually include several POI's located at the same geographical position, the POI's of the POI stacks, when selected by the user, are represented in a geographically abstracted form, as shown in illustration 6 as shown in FIG. 1e, in order to still allow the user an intuitive overview and an easier selection of the corresponding POI's. The abstracted representation is hereby implemented by way of graphically highlighting the selectable POI's 6a, for example in the form of a gray border 6b as shown in FIG. 1e. A selection process is carried out here by the user within the same control logic that already forms the basis for navigating in the geographical map on a smaller scale, as shown in illustration 1 in FIG. 1a.

The invention claimed is:

1. A method for resolving, operating and displaying POI stacks in a virtual environment displayed on a screen surface, comprising:
   when selecting a first POI stack with a plurality of POI's contained in the first POI stack, automatically scaling a representation of the virtual environment such that POI's contained in the first POI stack are represented on the screen surface so that individual POI's maintain a minimum size and a minimum distance to a neighboring POI when correctly positioned in the virtual environment,
   when the minimum distance cannot be maintained, combining a subset of the plurality of POI's contained in the first POI stack in at least one second POI stack as a function of a respective position of the individual POI's in the virtual environment, wherein the minimum distance is formed as a function of a threshold value, which is calculated dynamically and as a function of the available screen surface and of the total number POI's to be represented,
   displaying the individual POI's and the at least one second POI stack on the screen surface,
   when the second POI stack is selected by a user, representing the POI's contained in the second POI stack and the respective virtual environment in an adapted scale by dividing the second POI stack into its components,
   changing and increasing the displayed scale of the geographical map until all or at least a portion of the POI's contained in the POI stack can be displayed individually and can be correctly positioned in the virtual environment while still enabling navigation, and
   displaying a maximum possible number of POI's simultaneously in a meaningful way when correctly positioned in the virtual environment.

2. The method of claim 1, wherein the first POI stack is selected by using an operating logic that is identical to the operating logic used for navigation in the virtual environment.

3. The method of claim 1, wherein the plurality of POI's contained in the first POI stack are represented in abstracted form, when scaling of the representation of the virtual environment is insufficient for representing the plurality of POI's in the virtual environment at their respective position.

4. The method of claim 1, further comprising
   preselecting a POI in the first POI stack that is located closest to a position indicator, and
   representing this preselection by an altered crosshair.

5. The method of claim 1, further comprising highlighting a selection of a POI by depicting a visual and logical connection between a selection tool and the selected POI.

6. The method of claim 1, further comprising starting routing to a selected POI upon initiation by a user.

7. A system for resolving, operating and displaying POI stacks in a virtual environment, comprising
   at least one display medium for displaying a geographical map and POI's contained thereon,
   a device for inputting commands from a user that operate the system and enable navigation both on the geographical map and within the POI stack with a control logic,
   wherein the system is configured to
   when a first POI stack with a plurality of POI's contained in the first POI stack is selected by the user, automatically scale the representation of the virtual environment such that POI's contained in the first POI stack are represented on the screen surface so that individual POI's maintain a minimum size and a minimum distance to a neighboring POI when correctly positioned in the virtual environment,
   when the minimum distance cannot be maintained, combine a subset of the plurality of POI's contained in the first POI stack in at least one second POI stack as a function of the respective position of the individual POI's in the virtual environment,
   form the minimum distance as a function of a threshold value, which is calculated dynamically and as a function of the available screen surface and of the total number Pas to be represented,
   display the individual POI's and the at least one second POI stack on the screen surface,
   when the second POI stack is selected by a user, represent the POI's contained in the second POI stack and the respective virtual environment in an adapted scale by dividing the second POI stack into its components,
   change and increase the displayed scale of the geographical map until all or at least a portion of the POI's contained in the POI stack can be displayed individually and can be correctly positioned in the virtual environment while still enabling navigation, and display a maximum possible number of POI's simultaneously in a meaningful way when correctly positioned in the virtual environment.

8. The system of claim 7, wherein a GPS receiver determines a location of the user and transmits the location to the system.

* * * * *